UNITED STATES PATENT OFFICE.

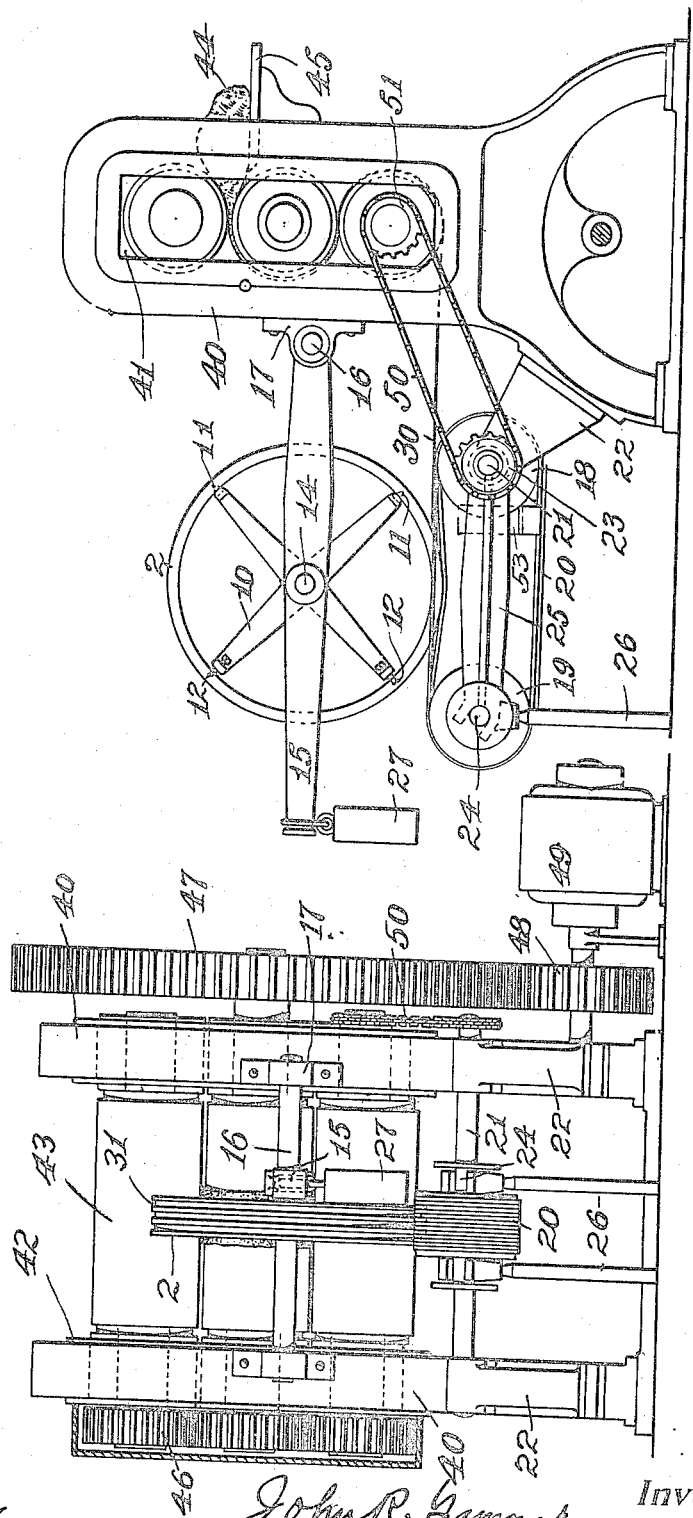

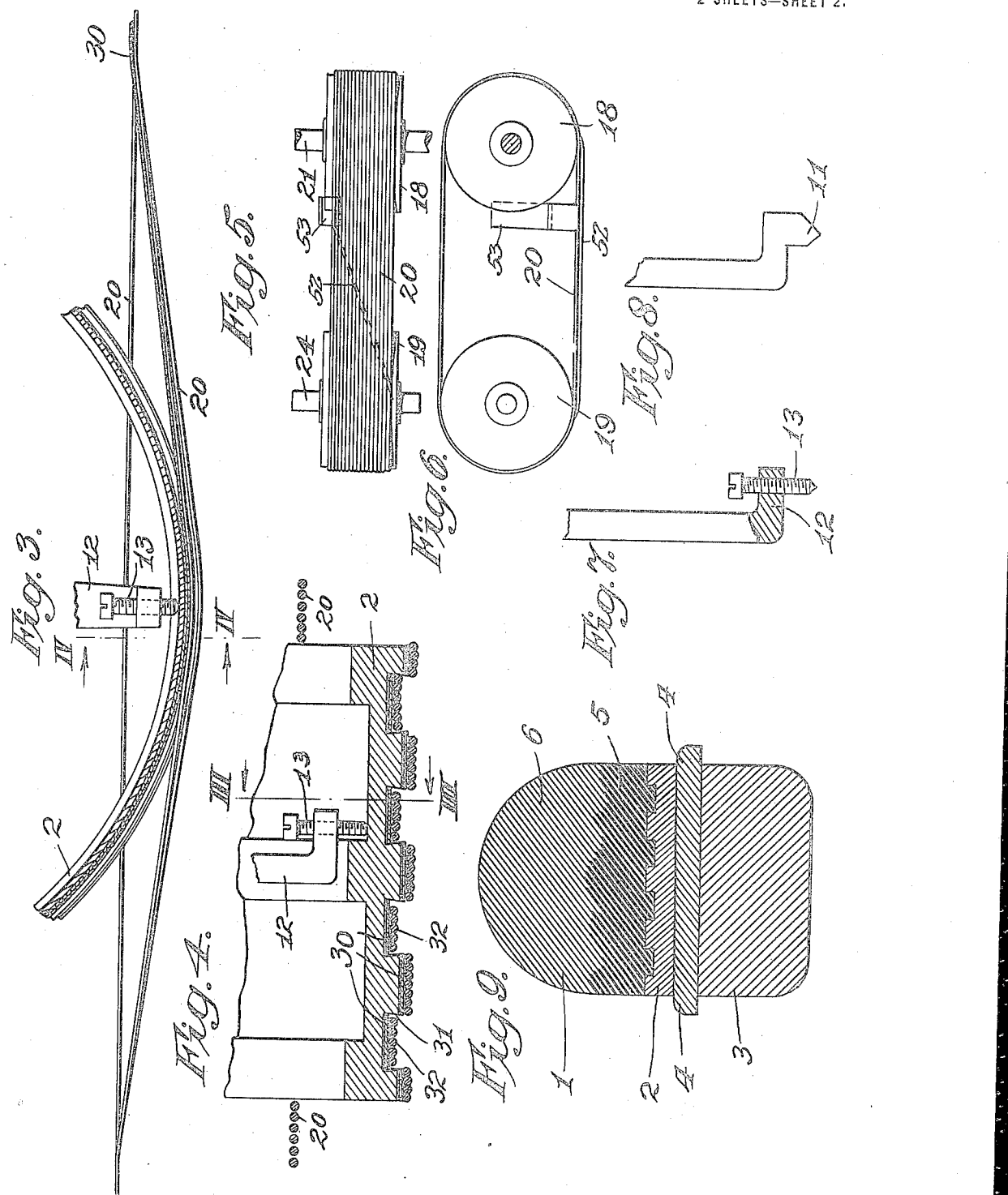

JOHN R. GAMMETER AND WALTER H. ALLEN, OF AKRON, OHIO, ASSIGNORS, BY MESNE ASSIGNMENTS, TO THE B. F. GOODRICH COMPANY, A CORPORATION OF NEW YORK.

PROCESS OF MAKING TIRES.

1,183,551.            Specification of Letters Patent.       Patented May 16, 1916.

Application filed November 11, 1910.    Serial No. 591,770.

*To all whom it may concern:*

Be it known that we, JOHN R. GAMMETER and WALTER H. ALLEN, citizens of the United States, residing in the city of Akron, county of Summit, and State of Ohio, have invented certain new and useful Improvements in Processes of Making Tires, of which the following is a specification.

This invention relates to improvements in methods of building up of solid rubber tires or similar articles. Solid rubber tires have been made in which the body of the tire of resilient material was vulcanized to and carried by a harder composition, which latter is in turn vulcanized to and carried by a metallic band capable of being attached to a rim mounted upon the felly of a wheel in a more rigid and simpler manner than was attainable in the attaching of the rubber tire directly to the channel or rim of a wheel. Difficulties have been experienced, however, in applying the rubber compound to the metallic base or rim, particularly where the latter was grooved or otherwise roughened to cause the rubber to interlock with it and adhere to it closely.

Our inventions comprise improved processes by which the rubber compound can be evenly laid upon the metal base or rim and forced into any grooves formed in the rim for the purpose of interlocking with the rubber, and an improved machine for practising said processes.

In the accompanying drawings which form a part of this specification, and in which an apparatus adapted to perform our invention is shown by way of illustration, Figure 1 is a front elevation of a machine for carrying out the method; Fig. 2 is a side elevation of the same, the driving gearing and roll carrying journal boxes being omitted for the sake of clearness; Fig. 3 is a longitudinal sectional view on an enlarged scale illustrating the action of the wire belt in rolling the rubber compound upon the rim; Fig. 4 is a section on line IV—IV of Fig. 3; Fig. 5 is a plan, and Fig. 6 is a side elevation of the wire belt and drums carrying the same; Figs. 7 and 8 are detail views of portions of the arms of the rim carrying spider; and Fig. 9 is a transverse section through a completed tire made with our machine and shown mounted upon a wheel felly.

Referring to the drawings in detail and particularly to Fig. 9, it will be seen that the form of the tire which it is desired to make, comprises a tire body or tire proper 1 of resilient material molded upon and preferably vulcanized to a metal base or rim 2, adapted to be secured by flanges, not shown, or in any other suitable manner, to a steel rim 4, shrunk or otherwise mounted upon the wheel felly 3. The resilient portion of the tire may be formed throughout of a homogeneous compound, but we prefer to make the same in at least two layers, the inner one of which 5, which engages directly with the metallic rim, being preferably formed of a compound of such nature that when vulcanized it will become comparatively hard. Upon this layer of compound is laid an outer layer 6, compounded in such a way that when subjected to the vulcanizing action it will acquire the proper resiliency to render it capable of acting as a cushion and to make it suitable for engagement with the road surface. The entire tire is preferably vulcanized at one operation, but the nature of the compounds forming the layers 5 and 6 is such that with the same degree of vulcanization each assumes the desired degree of hardness.

Referring now to our apparatus, the same comprises a spider or chuck 10, capable of supporting the rim 2. The spider preferably comprises a series of arms, shown as four, two of which have pointed ends 11, which engage within the rim, while the ends of the other two arms are bent at right angles, as indicated at 12 in Fig. 7, pointed set screws passing through the openings in the portions 12. The set screws are drawn back and the rim applied to the spider, being rested upon the pointed ends 11, when the set screws may be screwed out and caused to engage portions of the rim opposite to those engaged by points 11. The spider 11 is journaled upon a stub-shaft 14 projecting from an arm 15 supported at one end from a shaft 16, journaled in bearings 17 secured to a fixed support. It is obvious that in place of the spider any other suitable means for rotatably supporting the rim may be employed.

Below the rim is mounted a pair of drums 18 and 19 which carry a wire belt or series of wire belts 20. Each belt may be formed of a single endless wire passed a number of times over the drums which are preferably grooved, or may be formed of a plurality of individual endless wires. The former is the preferred construction, as a greater uniformity of tension on the different turns is attainable. In this construction, the turns of the endless wire pass around the drums, lying in grooves therein which serve to guide the turns and keep them all parallel, excepting the single length of wire passing diagonally from the outermost groove of the one drum to the outermost groove of the other drum across the lower run of the belt. This diagonal return strand 52 is brought into parallel with the other strands opposite the groove or drum 18 intended to receive it by a fixed guide 53 which changes the direction of this strand. The shaft 21 of the drum 18 is journaled in a bracket 22, projecting from a fixed support, a sprocket 23 being secured to the shaft and receiving power from any suitable source in order to rotate the drum 18 and drive the belt 20. The shaft 24 of the drum 19 is journaled in bearings formed in the ends of a pair of arms 25 pivoted to the shaft 21 of the drum 18, the ends of these pivoted arms being supported in any suitable manner, as upon standards 26.

The periphery of the rim 2 rests upon the upper run of the wire belt and is pressed thereagainst by its own weight, which may be supplemented, if necessary, by hanging a weight 27 upon the end of the arm 15. The layer of rubber compound 30 is fed upon the belt 20 and carried by the latter into engagement with the rim upon which it is rolled. The separate wires of the belt force the rubber into engagement with the rim, following the contour of the latter whether regular or otherwise. For instance, if the rim is provided with undercut circumferential grooves 31, as shown, some of the wires 32 will enter these grooves and roll the rubber compound thoroughly thereinto.

As will be obvious, flat bands may be used, if desired, in place of the round wires shown, but the latter are preferable as the pressure which they exert upon the material to be rolled upon the rim is localized and their action is therefore more effectual.

The strip of rubber compound 30, may be supplied to the belt in any desired manner, but it is preferable to mount the apparatus above described adjacent to a calendering machine, utilizing the frames 40 of the latter as the support for the bearings 17 and brackets 22.

The calendering machine may be of any well known construction, that shown comprising the upright frames 40 having vertical openings 41 therein in which slide the journal boxes 42 carrying the massive metal rolls 43. The mass of rubber compound 44 is fed from a platform 45 between the upper pair of calendering rolls, passing in a strip around the middle roll, between the middle and lower roll, and around and beneath the latter to the belt 20. The rolls 43 are geared together by means of spur gears 46, one of the rolls, preferably the middle one, carrying the large gear 47 driven from a pinion 48 carried on the shaft of a motor 49, or in any other suitable manner. The power for driving the belt 20 may conveniently be taken from one of the rolls, as, for example, by means of a chain 50 passing over the sprocket 23 and over a sprocket 51 secured to the projecting end of the journal of the lower roll.

In the making of tires according to our invention, we preferably provide a number of calendering machines having attached thereto the apparatus above described for rolling the rubber compound upon the rims, one complete machine being provided for each of the different compounds to be incorporated in the tire. The rim is then placed upon the machine feeding the compound to be used for the base of the tire and put in operation. The strip of compound 30 passes between the rolls and upon the traveling belt 20, which rolls it upon the rim, causing the latter to revolve through frictional contact. The location of the apparatus adjacent the calendering machine affords the advantage of supplying the strip of rubber compound to the belt before the compound has lost that degree of tackiness resulting from the temperature of the calendering. Not only does the warm condition of the rubber by its greater tackiness tend to increase the homogeneity of the tire as wound, but such condition also permits utilization of the shrinkage of the rubber in cooling, whereby an increased adhesion between layers is further promoted. When the rubber has been rolled upon the rim to a sufficient thickness, the rim is removed and placed upon the second machine, which applies the compound for forming the outer part of the tire. After enough of this has been rolled upon the rim, the rim and tire are placed in a mold and subjected to a vulcanizing action, which cures the rubber and causes the same to adhere firmly to the metal rim.

The wire belt is particularly efficacious on the first few layers of rubber in securing the desired degree of interlocking with the ribs in the rim, and it is possible to use in its place any suitable form of pressure device, preferably, however, of a yielding nature, for rolling the outer layers.

Our process is not limited to performance with any particular apparatus. The machine herein illustrated is claimed in a divisional application Serial Number 742,128, filed January 15, 1913.

Having thus described our invention, we claim:

1. The process of forming solid rubber tires consisting in winding a sheet of rubber compound about a rim until a sufficient number of layers to give the desired thickness of tire are applied, and then vulcanizing the tire while upon the rim.

2. The process of forming solid rubber tires consisting in winding a sheet of rubber compound about a rim until a sufficient number of layers to give the desired thickness of tire are applied, and then subjecting the rubber structure thus built up, while on the rim, to a vulcanizing action, thus uniting the successive layers of rubber to each other and uniting the rubber structure to the rim.

3. The process of forming the tread portions of solid rubber tires consisting in winding a sheet of rubber compound about a rim into substantially cylindrical form until the tread contains a sufficient number of substantially cylindrical layers to give the required thickness of tread, and then vulcanizing the tread thus built up.

4. The process of forming the tread portions of solid rubber tires consisting in applying successive thin layers of rubber compound to a rim in substantially cylindrical form, and rolling each layer as applied into homogeneous or welded contact with the preceding layer, and vulcanizing the tread thus built up.

5. The process of forming complete solid rubber tires consisting in winding a sheet of rubber compound into substantially cylindrical form upon an annular support.

6. The process of forming complete solid rubber tires consisting in winding a sheet of rubber compound into substantially cylindrical form upon an annular support, and vulcanizing the same.

7. The process of forming solid rubber tires consisting in winding a sheet of rubber compound upon an annulus until a laminated base has been built up from the successive windings, and then overlaying said base with a second sheet of rubber compound of such ingrediency that it will become less hard under the temperature of vulcanization, and winding such second sheet upon the laminated base until a laminated tread has been built up on said base.

8. The process of forming solid rubber tires consisting in winding a sheet of rubber compound upon an annulus of metal, graduating the width of said sheet to the dimensions of the tire to be formed, until a laminated base has been built up from the successive windings, and then overlaying said base with a second sheet of rubber compound of such ingrediency that it will become less hard under the temperature of vulcanization, and winding such second sheet upon the laminated base, and graduating the width of such second sheet in approximate correspondence to the desired dimensions of the tire to be formed, until a laminated tread has been built up on said base.

9. The process of forming solid rubber tires consisting in winding a sheet of rubber compound upon an annulus of metal, until a laminated base has been built up from the successive windings, and then superposing a second sheet of rubber compound of such ingrediency that it will become less hard under the temperature of vulcanization, and winding such second sheet upon the laminated base until a laminated tread has been built up on said base, and vulcanizing the tire thus formed directly upon said annulus.

10. The process of forming solid rubber tires consisting in winding a sheet of rubber compound upon an annulus of metal, graduating the width of said sheet to the dimensions of the tire to be formed, until a laminated base has been built up from the successive windings, and then superposing a second sheet of rubber compound of such ingrediency that it will become less hard under the temperature of vulcanization, and winding such second sheet upon the laminated base, and graduating the width of such second sheet in approximate correspondence to the desired dimensions of the tire to be formed, until a laminated tread has been built up on said base, and vulcanizing the tire thus formed directly upon and to said annulus.

11. The process of forming a solid rubber tire having a basic core of rubber harder than the parts external thereto consisting in winding a band of rubber upon a metallic rim in layers; forcing said band, during its winding, against said rim; and then superposing a second band of rubber characterized by greater resistance to vulcanization than the first, and winding it upon the core formed by the first band in layers, and forcing each layer as deposited against its predecessor.

12. The process of forming a solid rubber tire having a basic core of rubber harder than the parts external thereto consisting in winding a band of rubber upon a metallic rim in layers; and then superposing a second band of rubber characterized by greater resistance to vulcanization than the first, and winding it upon the core formed by the first band in layers.

13. The process of forming a solid rubber tire having a basic core of rubber harder than the parts external thereto consisting in winding a band of rubber upon a metallic rim in layers; and then superposing a second band of rubber characterized by greater resistance to vulcanization than the first, and winding it upon the core formed by the first band in layers, and vulcanizing the tire thus formed directly upon said band.

14. The process of forming a solid rubber tire having a basic core of rubber harder than the parts external thereto consisting in winding a band of rubber upon a metallic rim in layers; forcing said band, during its winding, against said rim; and then superposing a second band of rubber characterized by greater resistance to vulcanization than the first, and winding it upon the core formed by the first band in layers, and forcing each layer as deposited against its predecessor, and vulcanizing the tire thus formed directly upon said band.

15. The process of forming solid rubber tires consisting in winding a sheet of rubber compound about a form in successive layers, rolling each layer as applied into homogeneous or welded contact with the preceding layer by means acting upon the rubber in a plurality of adjacent parallel paths at different depths, and vulcanizing the resulting structure.

16. The process of forming solid rubber tires consisting in winding a strip of plastic rubber in cylindrical form, progressively wrapping such strip and impressing each successive portion of said strip as wrapped into substantially parallel corrugations running lengthwise of said strip.

17. The process of forming cushion tires consisting in winding a strip of plastic compound in cylindrical form of desired diameter, progressively wrapping such strip about itself and corrugating each layer as applied, and vulcanizing the resultant structure.

18. The process of forming cushion tires consisting in forming a solid base of rubber compound or similar elastically resilient material capable of vulcanization, by coiling a strip of said material upon itself in cylindrical form, striating the surface of each successive coil thereof as wound, and vulcanizing the completed structure.

19. The step in the process of forming a rubber tire having a base of harder rubber than the tread, by forming and winding upon itself a strip of rubber compound of progressively increasing resistance to vulcanization.

20. The step in the process of forming rubber tires of the cushion type by winding a strip of sheet rubber in annular form upon itself, consisting in impressing a series of parallel indentations upon said strip.

21. The process of making solid rubber tires which consists in wrapping a strip of warm freshly-calendered rubber compound upon itself on an annular support, said strip shrinking as it cools, and vulcanizing the resultant structure.

22. The process of forming the base of a solid rubber tire consisting in winding a strip of warm plastic rubber in cylindrical form and impressing the strip as wrapped into substantially parallel corrugations running lengthwise of the strip.

23. The process of forming cushion tires consisting in winding a strip of plastic compound in cylindrical form of the desired diameter, corrugating the strip as applied, and vulcanizing the resultant structure.

24. The steps in the process of making solid rubber tires having bases of harder vulcanizing compound than the treads consisting in forming a strip of rubber compound of uniform thickness and decreasing hardness and supplying such strip while in the tacky state resultant from the forming means direct to a tire-forming means.

JOHN R. GAMMETER.
W. H. ALLEN.

Witnesses:
WALTER K. MEANS,
MARCUS H. HILL.

DISCLAIMER.

1,183,551.—*John R. Gammeter* and *Walter H. Allen*, Akron, Ohio. PROCESS OF MAKING TIRES. Patent dated May 16, 1916. Disclaimer filed November 7, 1916, by the assignee, *The B. F. Goodrich Company*.

Enters this disclaimer—

"To the subject-matter of the following claims, to wit:

"1. The process of forming solid rubber tires consisting in winding a sheet of rubber compound about a rim until a sufficient number of layers to give the desired thickness of tire are applied, and then vulcanizing the tire while upon the rim.

"2. The process of forming solid rubber tires consisting in winding a sheet of rubber compound about a rim until a sufficient number of layers to give the desired thickness of tire are applied, and then subjecting the rubber structure thus built up, while on the rim, to a vulcanizing action, thus uniting the successive layers of rubber to each other and uniting the rubber structure to the rim.

"3. The process of forming the tread portions of solid rubber tires consisting in winding a sheet of rubber compound about a rim into substantially cylindrical form until the tread contains a sufficient number of substantially cylindrical layers to give the required thickness of tread, and then vulcanizing the tread thus built up.

"5. The process of forming complete solid rubber tires consisting in winding a sheet of rubber compound into substantially cylindrical form upon an annular support.

"6. The process of forming complete solid rubber tires consisting in winding a sheet of rubber compound into substantially cylindrical form upon an annular support, and vulcanizing the same.

"7. The process of forming solid rubber tires consisting in winding a sheet of rubber compound upon an annulus until a laminated base has been built up from the successive windings, and then overlaying said base with a second sheet of rubber compound of such ingrediency that it will become less hard under the temperature of vulcanization, and winding such second sheet upon the laminated base until a laminated tread has been built up on said base.

"9. The process of forming solid rubber tires consisting in winding a sheet of rubber compound upon an annulus of metal, until a laminated base has been built up from the successive windings, and then superposing a second sheet of rubber compound of such ingrediency that it will become less hard under the temperature of vulcanization, and winding such second sheet upon the laminated base until a laminated tread has been built up on said base, and vulcanizing the tire thus formed directly upon said annulus.

"12. The process of forming a solid rubber tire having a basic core of rubber harder than the parts external thereto consisting in winding a band of rubber upon a metallic rim in layers; and then superposing a second band of rubber characterized by greater resistance to vulcanization than the first, and winding it upon the core formed by the first band in layers.

"13. The process of forming a solid rubber tire having a basic core of rubber harder than the parts external thereto consisting in winding a band of rubber upon a metallic rim in layers; and then superposing a second band of rubber characterized by greater resistance to vulcanization than the first, and winding it upon the core formed by the first band in layers, and vulcanizing the tire thus formed directly upon said band.

"19. The step in the process of forming a rubber tire having a base of harder rubber than the tread, by forming and winding upon itself a strip of rubber compound of progressively increasing resistance to vulcanization.

"21. The process of making solid rubber tires which consists in wrapping a strip of warm freshly-calendered rubber compound upon itself on an annular support, said strip shrinking as it cools, and vulcanizing the resultant structure.

"24. The steps in the process of making solid rubber tires having bases of harder vulcanizing compound than the treads consisting in forming a strip of rubber compound of uniform thickness and decreasing hardness and supplying such strip while in the tacky state resultant from the forming means direct to a tire-forming means."

[*Official Gazette, November 21, 1916.*]